April 8, 1952  W. Y. STAMPER  2,592,207
PORTABLE BATTERY

Filed Jan. 29, 1946  2 SHEETS—SHEET 1

Inventor
Willson Y. Stamper
Henry Lanahan
Attorney

April 8, 1952   W. Y. STAMPER   2,592,207
PORTABLE BATTERY
Filed Jan. 29, 1946   2 SHEETS—SHEET 2
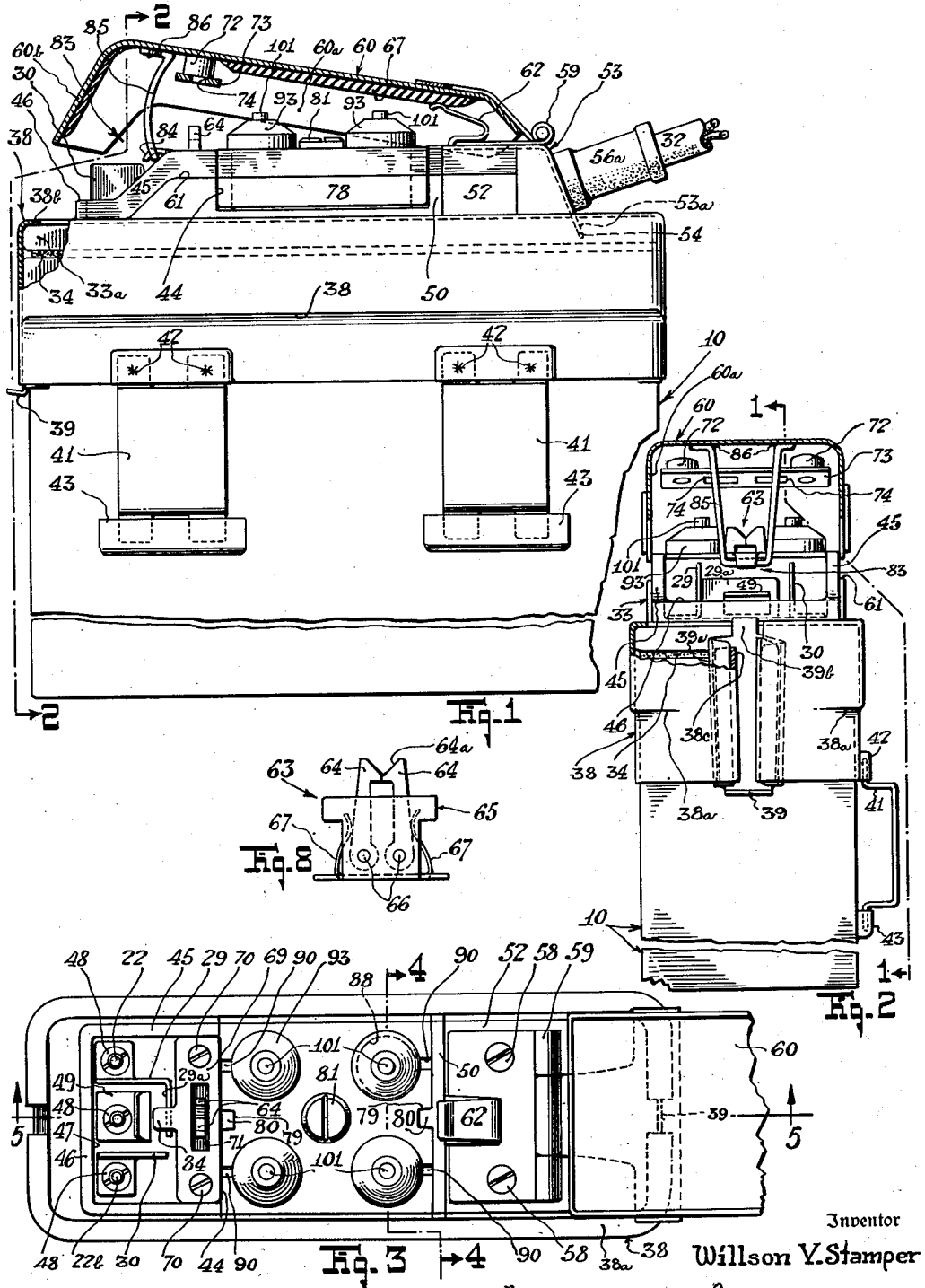
Inventor
Willson Y. Stamper
By Henry Lanahan
Attorney Patented Apr. 8, 1952

2,592,207

UNITED STATES PATENT OFFICE 2,592,207

PORTABLE BATTERY

Willson Y. Stamper, Newark, N. J., assignor to Thomas A. Edison, Incorporated, West Orange, N. J., a corporation of New Jersey Application January 29, 1946, Serial No. 644,062

5 Claims. (Cl. 136—170)

This invention relates especially to portable batteries for mine lamps, and is adapted particularly to small portable batteries of the Edison nickel-iron alkaline type, but no unnecessary limitation to batteries of this type is intended.

It is an object to provide a small and compact portable battery which is safe, reliable and efficient for use in the mine lamp field.

It is another object to provide a novel construction of such a battery which facilitates recharging the battery and prevents unauthorized tampering with the battery by the workmen.

It is another object to provide a novel venting arrangement for portable batteries which is adapted to prevent accidental spillage of electrolyte during use of the battery and during handling incidental to charging.

It is another object to provide a novel valve for batteries, which is controllable to release at different internal battery pressures.

It is another object to provide a latch for the cover of the battery which is arranged to safeguard against unauthorized tampering with the filler-opening structure of the battery.

It is another object to expose the charging terminals by a small initial opening movement of the cover, and to limit normally the opening of the cover to a partially-open position just exposing the terminals so that the battery will require a minimum space during charging and so that the cover may be easily closed after charging.

It is another object to provide an improved magnetic-type latch for the cover of batteries of the character described.

A further object is to provide a simple and economical construction of a portable battery wherein the abovestated objectives are fulfilled.

Still other and allied objects and features of my invention will be apparent from the following description and the appended claims.

In the description of my invention reference is had to the accompanying drawings, of which:

Figure 1 is a fractional side elevational view of a battery according to my invention, with parts in section substantially on the line 1—1 of Figure 2, and showing the cover in a partially-open position;

Figure 2 is a section taken substantially on the line 2—2 of Figure 1;

Figure 3 is a top plan view of the battery with the cover in a fully-open position but only fractionally shown;

Figure 8 is a detailed view of the latch mechanism for locking the cover in closed position.

Figure 5:
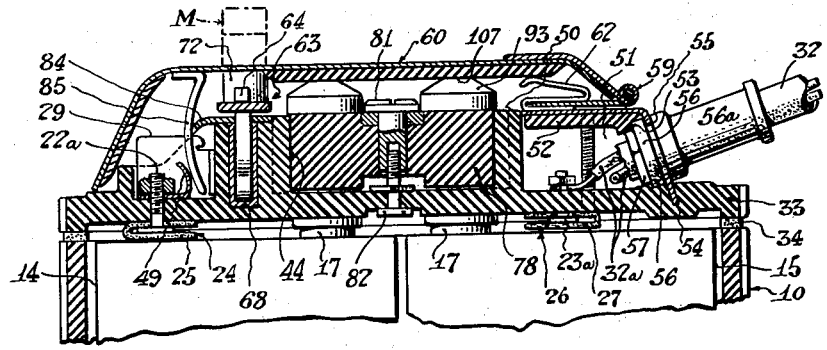
Figure 5 is a section taken substantially on the line 5—5 of Figure 3 but with the cover closed.

The present battery has an oblong case 10 of rectangular shape as viewed from the sides which is preferably molded from nylon, Bakelite or other suitable plastic. The case has a central partition 11 (Figure 7) which divides the interior space thereof into two compartments 12 and 13. In each of these compartments there are two cells 14 and 15, preferably of the nickel-iron-alkaline type, which have a common metallic container wall 16 therebetween. The cells 14 and 15 are provided respectively with upstanding tubular posts 14a and 15a which are insulated from the respective containers by washers 17; these tubular posts provide filler openings 18 for the cells. The internal connections of the cells 14 and 15 are reversed so that the containers of cells 14 form the negative terminals thereof and the posts 14a are their positive terminals, whereas the containers of cells 15 are the positive terminals of these cells and the posts 15a are their negative terminals. The group of cells 14 and 15 of each compartment are therefore connected serially through their common container wall 16. The details of the feature of connecting a positive electrode of one cell and a negative electrode of another cell to respective conducting containers of the cells, so that the cells will be connected serially together when the containers are abutted against one another, is not shown herein since the same is old in the art as shown, for example, by the Kammerhoff Patent No. 1,255,536 issued February 5, 1918. Between compartments, the cell groups are serially connected by a strap 19. The first and last posts 14a and 15a of the battery are connected by straps 20 and 21 to respective terminals 22 and 23. Two additional terminals 22a and 22b form with the terminal 22 a bank 24 of these terminals which is located at the top of the cells near the front of the case. These terminals are mounted in a rubber molding 25 which has a lower part to insulate the lower ends of the terminals from the cell containers. Likewise, there is an additional terminal 23a which forms with the terminal 23 a bank 26 of two terminals located at the top of the cells near the back of the case; these terminals 23 and 23a are likewise mounted in a rubber molding 27 having a lower part to insulate the lower ends of the terminals from the adjacent cell containers. The end terminal 22b is connected permanently by an insulated lead wire 28 to the terminal 23 and thence by the strap 21 to the post 15a of the battery. Thus the end terminals 22 and 22b of the bank 24 are connected permanently across the battery. To these terminals there are connected upstanding blades 29 and 30 which constitute a pair of charging terminals as is hereinafter described. The terminal 23a is connected permanently by an insulated lead 31 to the central terminal 22a. This terminal 22a is connectable to the terminal 22 by a switch as is hereinafter described. When this switch is closed the terminals 23 and 23a are likewise connected across the battery. These terminals 23 and 23a are herein referred to as the output terminals of the battery. Connected to these terminals are lead wires 32a of a cable 32. This cable is to be connected to the load for the battery which, for example, may typically be a mine lamp.

Figure 7:
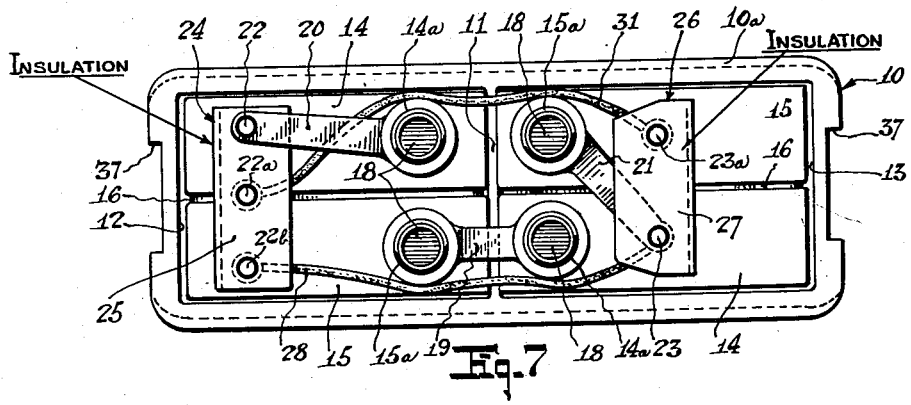
Figure 7 is a top plan view with the lid of the battery case removed, showing the wiring of the battery cells to the charging and output terminals thereof.
Figures 4, 6:
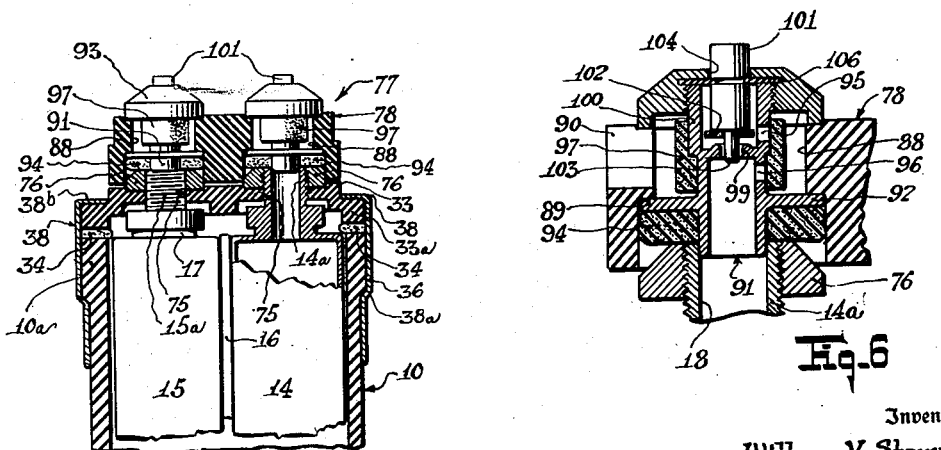
Figure 4 is a fractional view with parts in section on the line 4—4 of Figure 3.
Figure 6 is a section to enlarged scale through one of the vent valves.

On the case 10 there is a molded lid 33 also made preferably of plastic material which has a depending rim 33a seating on a rubber gasket 34 that lies on the top edge of the case. The case has a top border 10a of increased thickness which runs along the sides and around the corners thereof to provide it with exterior shoulders 36 at the sides and with exterior recesses 37 at the ends (Figures 4 and 7). Surrounding the top portion of the case and embracing the edge of the lid 33, to hold the lid in place, is a retaining band comprising two identical band sections 38 which have shoulders 38a lengthwise thereof to engage the shoulders 36 of the case and a turned-over rim 38b at the top for engaging the rim of the lid 33. The ends of these band sections are turned inwardly to form hooks 38c that project into the recesses 37. The adjacent hooks at each end of the case diverge in going from the bottom to the top thereof as shown in Figure 2. In the recesses 37 there are clamps 39 having the side edges thereof turned over to form hooks 39a which also diverge in going from the bottom to the top thereof. The hooks 38c and 39a interlock slidably so that the clamps 39 draw the band sections tightly against the case as each clamp is forced into an upward position shown in Figure 2. On these clamps there are upstanding ears 39b which are bent over across the adjacent edges of the band sections, after the clamps are forced into their upward positions, so as to lock the clamps in place. As the band sections are drawn together the top rim 38b thereof engages the lid 33 and the shoulders 38a thereof engage the shoulders 36 so as to clamp the lid tightly to the case.

At one side of the case there are two brackets 41 having offset lugs at the top spot-welded at 42 to the adjacent band section 38 and similar lugs at the bottom which engage pockets 43 formed integrally with the case. These brackets are adapted to receive belt straps (not shown) for carrying the battery.

The lid 33 has a thick transverse wall 44 standing upwardly therefrom near the front thereof. Extending forwardly from this wall are two downwardly-inclined relatively thin side walls 45 which are joined at the front by a cross rib 46 to form a pocket 47 as shown in Figures 1 and 3. This pocket has three openings in the base thereof for receiving the terminals 22, 22a and 22b abovementioned. Secured by nuts 48 to the terminals 22 and 22b are turned-over lugs of the blade-shaped charging terminals 29 and 30 aforementioned. Also secured by a nut 48 to the central terminal 22a is a contact member 49. Spaced behind this contact member is a contact arm 29a of the charging terminal 29. The contact member 49 and contact arm 29a constitute two stationary contacts of a switch for connecting the battery to the output terminals 23—23a as is hereinafter explained.

Spaced rearwardly from the wall 44 is another transverse wall 50, and behind this wall there is a shallow pocket 51 having openings in the bottom thereof through which the two output terminals 23—23a extend (Figures 1 and 5). It is in this pocket that the lead wires 32a are secured to the output terminals.

The pocket 51 is covered by a molded cap 52 of insulating material and this cap is in turn covered by a metal cap 53 which conforms thereto. The metal cap 53 has a back wall 53a the bottom part of which is anchored at 54 to the lid 33. In this wall 53a there is an opening 55 engaged by a rubber grommet 56 which is provided integrally with an extending sleeve 56a. The cable 32 extends through this sleeve and grommet and is held against being pulled outwardly therefrom by a metal clamp 57 on its inner end. These caps 52 and 53 are clamped to the lid by two screws 58 which thread into the lid 33 at the bottom of the pocket 51.

Secured to the top wall of the cap 53 by the screws 58 abovementioned is the base element of a hinge 59, the other element of which is secured as by spot-welding to a metal cover 60. This cover overlies the lid and has turned-down sides 60a which engage recesses 61 at the sides of the lid in the walls 44, 45 and 50 so that they lie flush with the exposed portions of these walls when the cover is closed. Also, the cover has a front hood 60b which serves to enclose the charging terminals 29 and 30 when the cover is closed.

The cover is biased open by a spring 62 interposed between it and the base element of the hinge 59, but is latched automatically as it is closed by a latch mechanism 63 (Figures 5 and 8). This latch mechanism comprises two pawls 64 which are mounted face to face in a housing 65—they being pivoted thereto at 66—and which are biased against one another by respective cantilever springs 67 as shown in Figure 8. This latch housing seats in a recess 68 (Figure 5) provided in the wall 44 of the lid structure and is retained therein by a cover plate 69 held to the wall by screws 70 (Figure 3). The cover plate has a central opening 71 through which the latch pawls extend. Secured to the cover are two inwardly-extending posts 72 which lie at opposite sides of the latch pawls when the cover is closed, and riveted to these posts is a plate 73 having two openings 74 (Figure 2) for receiving the latch pawls respectively. The heads of the latch pawls have beveled faces 64a (Figure 8) so that on pressing the cover downwardly into closed position the portion of the plate 73 between its openings 74 engages these faces and cams the pawls apart, the pawls then snapping together under influence of the springs 67 to catch the plate 73 and latch the cover when the cover is closed.

The latch mechanism 63 is a magnetically releasable one requiring the use of a strong horseshoe magnet M in order to open the cover. As shown in Figure 5, the poles of the magnet are applied to the cover at the places of the posts 72 in order to so unlatch the cover. To permit this magnetic unlatching, the cover 60, latch cover plate 69 and latch plate 73 are made of non-magnetic materials such as brass or aluminum but the posts 72 and latch pawls 64 are made of magnetic materials such as soft iron. Thus, when the magnet is applied to the posts 72, the latter act as pole shoes for the magnet to direct the flux to the latch pawls so that they are pulled apart magnetically into their released positions.

In the lid 33 between the walls 44 and 50 there are four openings 75 (Figure 4) through which project the tubular posts 14a and 15a of the cells 14 and 15. Threaded on the upwardly-projecting ends of these posts are respective nuts 76 which are tightened against the lid to securely hold the cells thereto. For each filler opening 18 there is a vent valve 77. These vent valves are mounted in a block 78 of plastic material so that they can be installed and moved as a unit. This block has two grooves 79 in the walls thereof confronting the walls 44 and 50 and in these latter walls are respective tongues 80 which engage the grooves to locate the block in a correct position. At the center of the block there is a hollow screw 81 which is adapted to thread onto a projecting stud 82 on the lid for securing the block in place.

The vent valves 77 are hereinafter described in detail but are not herein claimed since the same are disclosed and claimed in my divisional application Serial No. 178,637 filed August 10, 1950, and entitled "Release Valve."

In order that the cover will normally be limited, when the latch mechanism 63 is released, to a partially-open position just exposing the charging terminals, which is a position adapted to prevent the workmen from gaining access to the closure block 78, there is provided a second latch 83 which locks the cover in the partially-open position it occupies in Figure 1. In this partially-open position the cover encloses substantially the block 78 of the vent valves 77 but exposes the charging terminals 29 and 30 so that connections can be made readily thereto to charge the battery. This second latch comprises a lug 84 projecting forwardly from the latch cover plate 69, and a U spring 85 which is curved as viewed from the side and which is secured at 86 to the cover 60. When the latch mechanism 63 is released, the cover is snapped upwardly by the spring 62 into the abovementioned partially-open position whereat the spring 85 catches onto the lug 84. To open the cover fully, it is necessary to flex the spring 85 forwardly, as by inserting a tool—say a screw driver—between the cover and the lid and pressing the spring forwardly until it is released from the lug.

The spring 85 constitutes also a movable switch element for bridging the contact members 29a and 49 to connect the battery to the ouput terminals 23—23a when the cover is closed. For this purpose the contact member 49 is upwardly curved (Figures 3 and 5) so that the spring will wedge itself between this contact member and the contact arm 29a and make positive electrical contact therewith. It will be understood that by means of this cover-controlled switch the battery is disconnected automatically from the output terminals when the cover is moved to a partially-open position to expose the charging terminals 29 and 30.

In the block 78 there are mounting holes 88 (Figures 4 and 6) for the respective vent valves the bottom portions of which are enlarged in diameter to provide the holes with interior shoulders 89. Leading from these holes are respective slits 90 running out the ends of the block to provide escape ducts for the valves. Each valve comprises a tubular member 91 having an annular flange 92. The tubular member extends through the mounting hole 88 and is secured therein, with the flange 92 bearing against the shoulder 89, by a circular cap 93 that is threaded tightly on the top part of the tubular member against the block 78. Fitting the lower part of the tubular member is a rubber gasket 94 which, as the block 78 is tightened to the lid by the screw 81, is compressed between the flange 92 and the upper edge of the respective post 14a or 15a to seal the vent valve thereto.

The tubular valve member is provided with adjoining inner and outer unthreaded portions between the flange 92 and the cap 93 which have smaller and larger diameters respectively. Through these portions extend respective vents 95 and 96. On the valve member 91 there is a rubber sleeve 97 which covers these vents. This sleeve has a uniform outer diameter and has therefore a lesser-thickness portion covering the outer vent 95 and a greater-thickness portion covering the inner vent 96 as shown in Figure 6. The portion covering the vent 95 has accordingly a lesser spring constant than has the portion covering the vent 96, with the result that with increasing pressure in the cell the vent 95 will open at a predetermined lower pressure and upon closing off this vent and allowing the internal pressure of the cell to increase further, the vent 96 will open at a predetermined higher pressure. Typically the sleeve 97 is chosen so that the vents 95 will open at a battery pressure of from 1 to 5 pounds and the vents 96 at a pressure from 25 to 35 pounds.

In the tubular valve member 91 between the vents 95 and 96 there is a reduced-diameter opening 99 surrounded by an interior shoulder providing an internal valve seat 100. Cooperating with this valve seat is a valve plunger 101 having a shouldered inner end provided with a resilient ring 102 for engaging the valve seat and having a projecting guide stem 103 that extends through the opening 99. The outer end portion of the plunger 101 extends loosely through an opening 104 in the cap 93 to a small distance therebeyond. This plunger 101 is sealed to an annular diaphragm 106 the peripheral portion of which is clamped against the end of the valve member 91 by the cap 93. The diaphragm 106 seals the upper end of the valve member 91 and resiliently supports the plunger 101 in open position shown in Figure 6. In this position of the plunger 101 both vents 95 and 96 have communication with the cell and the vent 95, which opens at a lower internal pressure, is controlling to prevent the internal pressure of the cell exceeding the lower limit abovementioned. Upon pressing the plunger 101 downwardly against the valve seat 100 the vent 95 is sealed off from the battery and the vent 96 is then controlling to allow the internal pressure of the battery to rise to the upper limit abovementioned.

The cover 60 is adapted to impinge against the four plungers 101 of the valves 77 and to hold the plungers closed while the cover is latched in closed position. In order that these plungers will each be held closed under suitable pressure while the cover is closed, the cover is lined with a resilient pad 107 on its inner wall overlying the closure block 78.

By controlling the plungers 101 by the cover as above described, the vent valves are held closed while the battery is in use unless the internal pressures of the cells build up to exceed the maximum limit abovementioned—which they ordinarily will not do during the course of a normal working day. The vent valves therefore ordinarily prevent leakage of the electrolyte should the battery be inverted while it is in use. Also I require that in handling during charging some build-up in internal pressure occur before the vent valves will open, this being so as to then prevent also accidental leakage or spillage of the electrolyte. For this purpose the vent valves may open at the lower limit specified. This is accomplished automatically as the cover is opened to expose the charging terminals 29 and 30 since in that opening of the cover the plungers 101 are open and the vent valves 95—97 is then controlling.

I have herein shown and described a preferred embodiment of my invention but it will be understood that this embodiment is subject to changes and modifications without departure from the scope of my invention, which I endeavor to express according to the following claims.

I claim:

1. In a battery for mine lamps including a case and a pair of output terminals: the combination of a cover for said battery movably connected to said case, charging terminals for said battery rendered accessible by moving said cover to a partially-open position, a removable filler-opening closure for said battery arranged in relation to said cover so that the same is rendered accessible only when the cover is moved beyond said partially-open position, a latch for limiting the opening of said cover to said partially-open position, and a switch in part common with said latch for causing said battery to be connected to said output terminals when said cover is closed and to be disconnected from said terminals when the cover is in said partially-open position.

2. In a battery construction for mine lamps including a case, a removable filler-opening closure, an output circuit connected across said battery and a pair of charging terminals: the combination of a cover movably connected to said case and arranged with respect to said charging terminals and said filler-opening closure to cause the charging terminals to be accessible when said cover is in a partially-open position and to cause the filler-opening closure to be also accessible when the cover is in a more open position; a latch for normally limiting the opening of said cover to said partially-open position; and means operated by said cover in the opening movement thereof to said partially-open position for opening said output circuit.

3. In a battery including a case: the combination of a pair of charging terminals on said battery near one side thereof, a vented filler opening on said battery spaced from said one side beyond said charging terminals, a cover cooperating with said case for enclosing said charging terminals and said filler opening, means movably securing said cover to said case for opening movement of the cover progressively from said one side to the opposite side of the battery, said cover having a partially-open position wherein it exposes only said charging terminals and a fully-open position wherein it exposes also said filler opening, means for holding said cover closed, and releasable catch means concealed by said cover and operatively interposed between the cover and said case for normally withholding the cover from opening beyond said partially-open position.

4. In a mine-lamp battery having a case: the combination of a cover for said battery hinged to one side of said case; a pair of charging terminals in said case positioned adjacent to the wall of said case opposite said one side thereof whereby the same are exposed when said cover is in a partially-open position; a catch member on said case below said cover; a latch member of electrically-conductive material on said cover adapted to hook onto said catch member to limit the opening of said cover normally to said partially-open position; a pair of output terminals for said battery; and circuit means for electrically connecting said battery to said output terminals as said cover is closed, comprising a switch serially included therein and having two spaced electrical contacts supported insulatedly in the upper portion of said case and in the path of said latch member whereby said contacts are interconnected by said latch member as said cover is moved from its said partially-open position to closed position.

5. In a battery including a case and a cover movably connected to said case: the combination of charging terminals for said battery rendered accessible by moving said cover to a partially-open position; a removable filler-opening closure for said battery arranged in relation to said cover so that the same is rendered accessible only when the cover is moved beyond said partially-open position; and a pressure-responsive venting means associated with said closure comprising an inlet leading from the battery and two outlets communicating with said inlet, pressure-responsive closure means associated with said outlets respectively and adapted to cause one outlet to open when the inlet pressure reaches a predetermined lower value and the other outlet to open when said pressure reaches a predetermined higher value, a closable valve between said inlet and one of said outlets, and a stem on said valve projecting from said venting means and operable by said cover in its movement between closed and said partially-open positions to cause said venting means to open in response to said higher pressure when the cover is closed and in response to said lower pressure when the cover is in said partially-open position.

WILLSON Y. STAMPER.

REFERENCES CITED

The following references are of record in the file of this patent:

UNITED STATES PATENTS

| Number | Name | Date |
|---|---|---|
| 298,143 | Weston | May 6, 1884 |
| 1,353,540 | Parrish | Sept. 21, 1920 |
| 1,376,109 | Miller | Apr. 26, 1921 |
| 1,393,845 | Davis | Nov. 29, 1921 |
| 1,417,430 | Tulloch et al. | May 23, 1922 |
| 1,527,624 | Blake | Feb. 24, 1925 |
| 1,756,072 | Smith | Apr. 29, 1930 |
| 1,765,027 | Mitchell | June 17, 1930 |
| 2,109,137 | Marsh | Feb. 22, 1938 |
| 2,179,393 | Wheat | Nov. 7, 1939 |
| 2,234,673 | Grierson | Mar. 11, 1941 |
| 2,318,371 | Bushman | May 4, 1943 |

FOREIGN PATENTS

| Number | Country | Date |
|---|---|---|
| 636,652 | France | Jan. 14, 1928 |
| 78 | Great Britain | 1912 |